United States Patent [19]
Fendley et al.

[11] 3,954,435
[45] May 4, 1976

[54] LASER CONSTRUCTION AND TUNING METHOD

[75] Inventors: James R. Fendley, Haddon Heights; Carl Harry Knowles, Moorestown, both of N.J.

[73] Assignee: Metrologic Instruments, Inc., Bellmawr, N.J.

[22] Filed: July 19, 1974

[21] Appl. No.: 490,186

Related U.S. Application Data

[63] Continuation of Ser. No. 390,889, Aug. 23, 1973, Pat. No. 3,859,072.

[52] U.S. Cl. ........................... 65/54; 29/404; 29/407
[51] Int. Cl.² ........................................ C03B 23/06
[58] Field of Search .............. 29/404, 407, 25.11, 29/25.13; 65/42, 54, 29; 331/94.5 D

[56] References Cited
UNITED STATES PATENTS

| | | | |
|---|---|---|---|
| 3,210,145 | 10/1965 | Fyler | 65/42 UX |
| 3,566,302 | 2/1971 | Rhodes | 331/94.5 D |
| 3,601,476 | 8/1971 | Mackenzie | 331/94.5 D X |
| 3,775,700 | 11/1973 | Garman | 331/94.5 D |

*Primary Examiner*—Charlie T. Moon
*Attorney, Agent, or Firm*—Paul & Paul

[57] ABSTRACT

Two central bore assemblies are constructed, each including a ceramic tube having a plurality of drilled disc assemblies frictionally attached thereon. A cathode element is inserted in the central portion of an outer envelope, as are the two grid-bore assemblies. The inner portion of the envelope is maintained in a partial vacuum, and heat is applied to the exterior, thereby shrinking the envelope over the grid-bore assemblies. A taut tungsten wire is inserted through the bore, and the envelope in the region of each of the disc assemblies is heated successively, from one side to the other. This achieves precise alignment of the central bore throughout the laser. Anode elements are inserted at either end, and mirrors are attached. After preliminary adjustment, the mirrors are fine-tuned by means of application of a narrow band of heat on the mirror neck, as slight transverse forces are applied to the sides of the mirrors.

2 Claims, 10 Drawing Figures

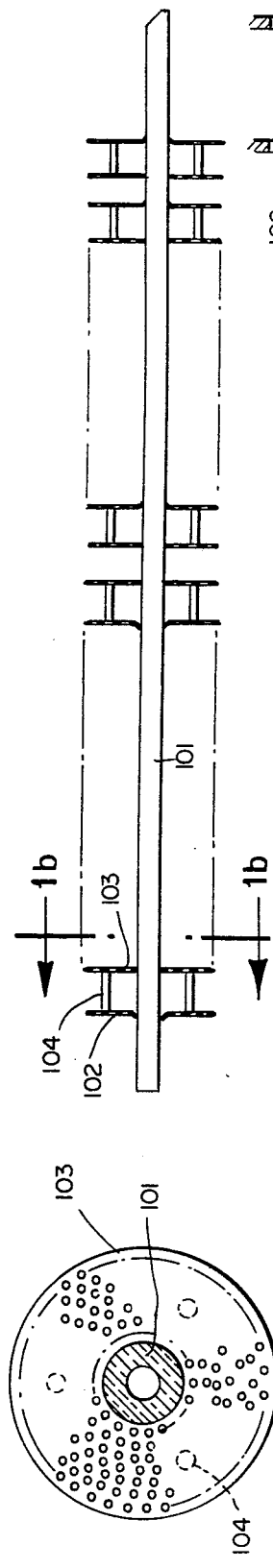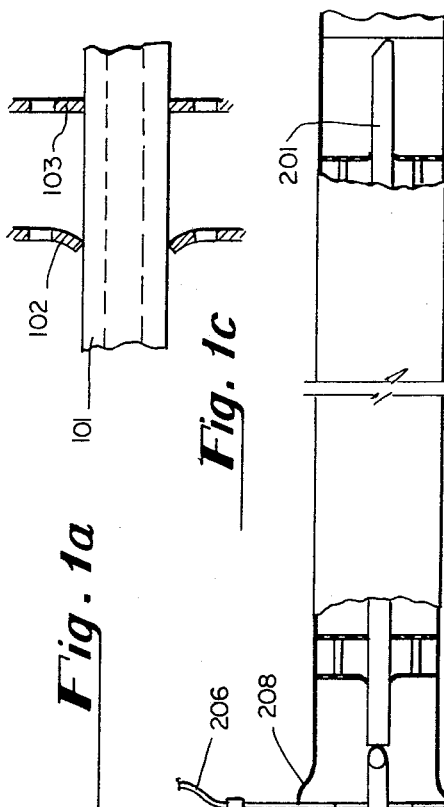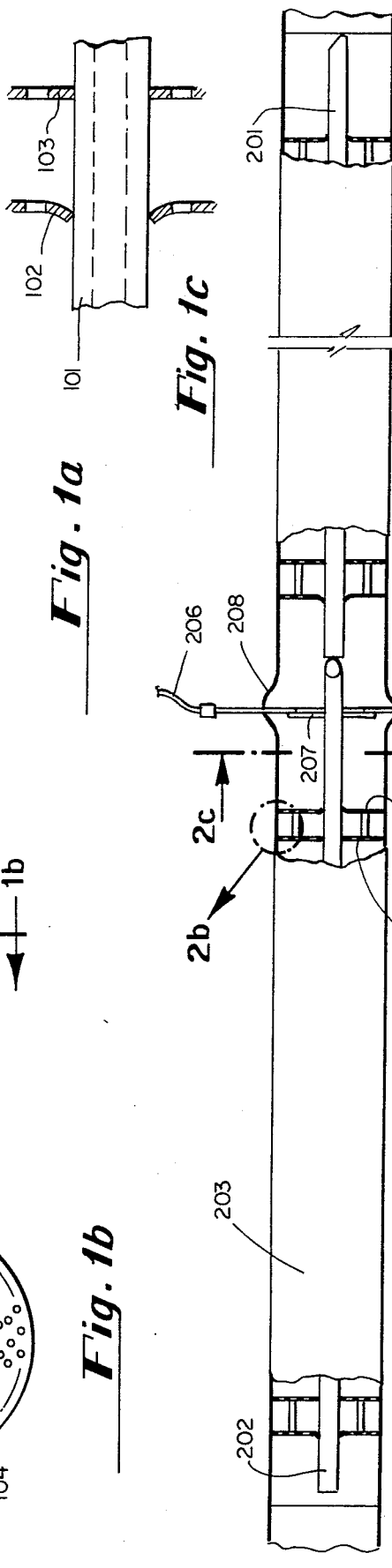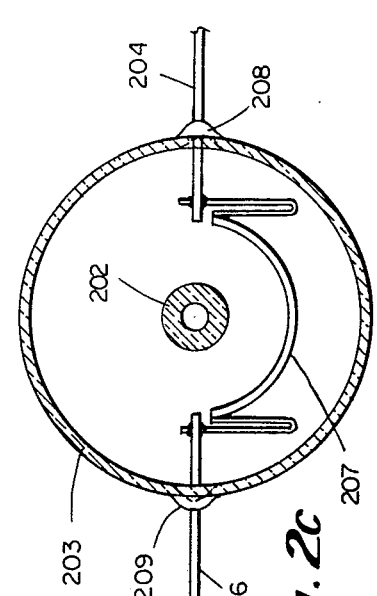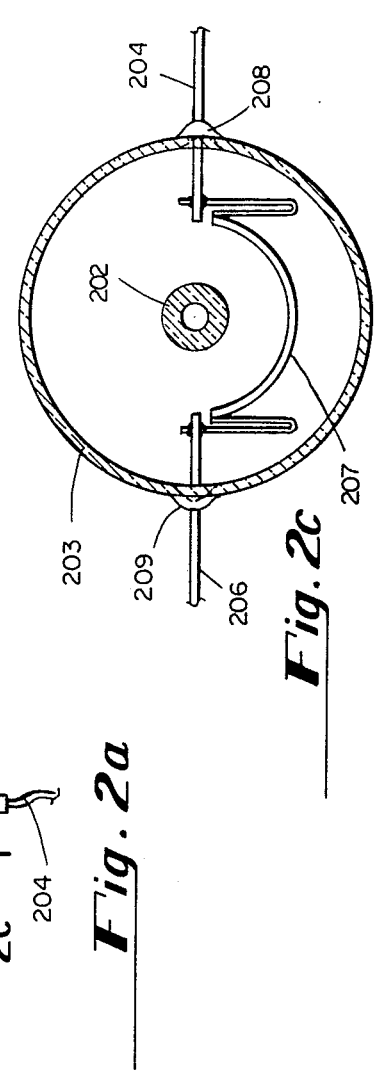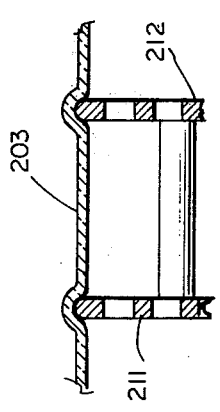

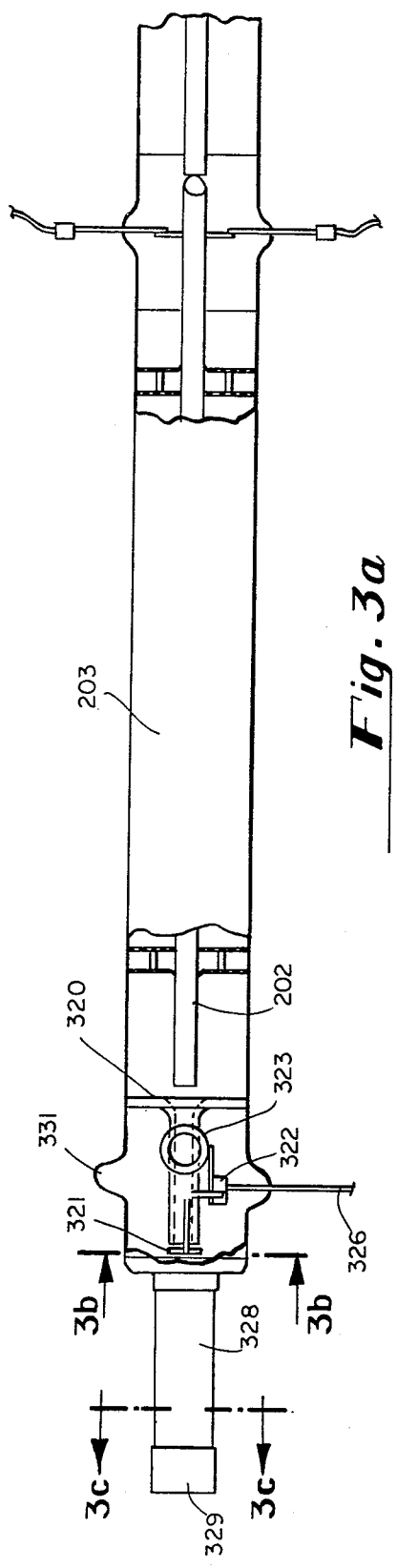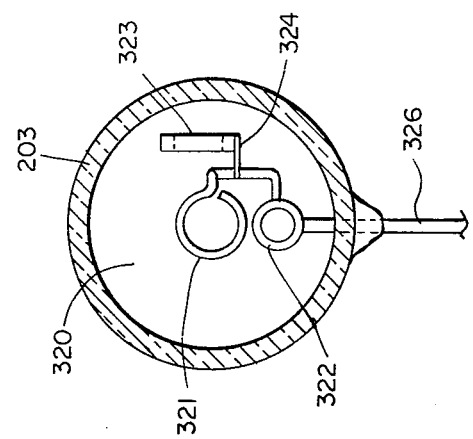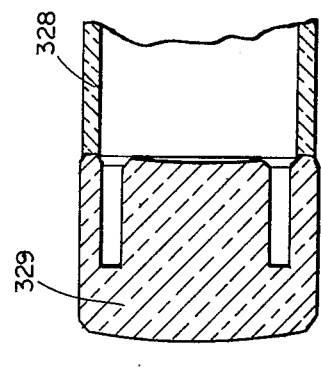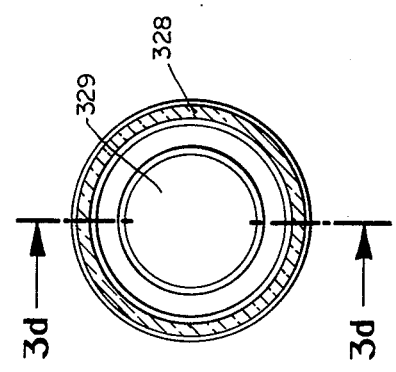

LASER CONSTRUCTION AND TUNING METHOD

This is a continuation of application Ser. No. 390,889 filed Aug. 23, 1973, now Pat. No. 3,859,072.

BACKGROUND OF THE INVENTION

1. Field of the Invention

This invention relates to the fabrication of lasers. More particularly, it relates to fabrication and fine tuning of laser apparatus which utilizes recirculation geometry.

2. Description of the Prior Art

A class of helium-cadmium lasers utilizes cataphoretic transport to define the cadmium vapor density in the laser tube. Cataphoresis, also known as electrophoresis, refers to the movement of suspended particles through a fluid under the action of electromotive force applied to electrodes in contact with the suspension. In the context of lasers, the electromotive force is applied at the anode and cathode electrodes, and the fluid is the helium-cadmium gas in the tube. In accordance with known techniques, helium-cadmium cataphoretic lasers utilize a recirculation geometry, in which a by-pass path is provided for cadmium vapor to diffuse back from the cathode to the anode end of the laser tube. Because the cataphoretic flow rate in cadmium lasers is much faster than the diffusion flow rate, the cross-sectional area of the bypass path must be much larger than that of the main discharge bore. In particular, it has been shown that the bypass path should be approximately two orders of magnitude larger than the main bore. Consequently, special precautions are necessary to prevent breakdowns through the return path. In accordance with accepted procedures, baffles arranged along the principle axis of the tube prevent breakdown in the diffusion return line without impeding the vapor flow.

In a typical configuration, a cathode element is located approximately in the center of the laser tube, and anode elements are located at either end. Ceramic tubes which define the main discharge bore are situated on the center axis of the main tube, and grids (i.e., baffle arrangements) are located periodically along the principal axis between the central bore and outer envelope tubes. In particular, the baffle arrangements may be made of honeycomb cylindrical segments, or alternatively as pairs of connected perforated discs. Thus, by the connection of the central bore tube with the outer envelope of the laser, a coaxial vessel is formed, with the metal grids preventing breakdown in the diffusion line but not impeding the vapor flow. Situated at either end of the laser are mirrors which, when properly adjusted along the principal axis of the laser, induce lasing when the helium-cadmium gas is energized by the electrodes.

It is an object of the present invention to provide methods for fabricating cataphoretic lasers.

It is a further object of the present invention to provide methods for fine tuning cataphoretic lasers to achieve effective laser action.

SUMMARY OF THE INVENTION

The present invention is a method of fabricating cataphoretic type lasers which involves the controlled shrinkage of an outer glass tube over inner assemblies which include central bore ceramic tubes and periodic double grid units which comprise perforated washers. Additionally, the present invention involves fine tuning of the fabricated laser by utilizing controlled heating and bending of either end of the tube.

A method which illustrates the principles of the present invention includes the constructive of a grid bore assembly from a ceramic tube and a plurality of perforated discs. A cathode element is mounted on the center axis of the outer glass envelope of the laser, and the two grid bore assemblies are inserted with their junction in the region of the cathode. The tube is pumped to a partial vacuum and a mixture of gas is passed through the tube while heat is applied from the outside. The glass tubing envelope is thereby shrunk to lock each of the double grid assemblies into place. A taut tungsten wire through the central bore attaches the assembly to a lathe, and the outer envelope in the region of each of the grid assemblies is reheated, starting at the gas inlet end. As the heating passes from one end of the tube to the other, contaminants are moved thereacross. At the center, the two separate grid bore assemblies are precisely aligned with one another, utilizing the taut wire, and the remainder of the grid assemblies are successively reheated. The anode electrodes are installed at either end of the tube, after which the terminating mirrors at either end of the laser are attached. The tube is sealed, and one or both of the mirror necks are exposed to a very narrow electrically heated oven. Thereupon, a slight transverse tuning force applied to one or both of the mirrors results in a permanent set of the correct mirror tuning.

Utilization of the foregoing method provides for a high quality cataphoretic laser structure which may be built at relatively low cost. In addition, the mirror adjustment method provided affords an accurate yet inexpensive final tuning procedure.

BRIEF DESCRIPTION OF THE DRAWINGS

FIG. 1a shows an assembly of the central bore tube of the laser with perforated disc assemblies mounted thereon; FIG. 1b shows a cross-sectional view of a disc grid assembly; and FIG. 1c shows an enlarged view of the juncture of a disc grid assembly and the central bore tube.

FIG. 2a shows a cut-away view of the outer glass tubing shrunk over two grid bore assemblies such as shown in FIG. 1a, and with a cathode element mounted in the center; FIG. 2b shows an enlarged view of the juncture of the grid discs and the shrunken outer tubing of the laser; and FIG. 2c shows a cross-sectional view of the central cathode portion of the FIG. 2a apparatus.

FIG. 3a shows a cut-away view of the anode portion of a laser constructed according to the principles of the present invention; FIG. 3b shows a cross-sectional view of the same anode apparatus; and FIGS. 3c and 3d show different views of end-piece mirrors utilized for the laser of FIGS. 1a through 3a.

DESCRIPTION OF THE PREFERRED EMBODIMENT

The first step to be performed in a method which embodies the principles of the present invention is to assemble a pair of combination grid-bore assemblies. FIG. 1a shows one of the assemblies after it has been constructed. A ceramic bore tube 101 forms the principle axis for attachment of the separate grid-baffle assemblies. In accordance with known characteristics of cataphoretic transport lasers, the central bore of tube 101 constitutes the principle chamber for lasing of the gas. The outer grid assemblies are utilized to prevent breakdown through the return path of the gas while similarly preventing the loss of cadmium from the hot region of the discharge tube. In the apparatus which results from construction in accordance with the principles of the present invention, a coaxial geometry is utilized, with the gas return path being concentric about the central bore tube 101. As shown in FIG. 1a, a series of disc pairs are attached along the length of the central bore tube 101.

A cross-sectional view of each of the disc pairs is shown in FIG. 1b. The metallic discs, such as 102 and 103 of FIG. 1a, are connected together by means of a series of spacer bars, such as 104. As is shown in FIG. 1b, one of each of the disc pairs has a diameter slightly smaller than that of the other. This permits the leak proof fit such as shown in exaggerated scale in FIG. 1c. Satisfactory characteristics for the outer coaxial return path result if each of the discs is perforated such as shown in FIG. 1b.

To summarize, the first steps involve the fabrication of double grid assemblies of perforated discs, one having a larger inner diameter than the other. These disc assemblies are attached to the ceramic central bore tube 101 such that the smaller inner diameter discs maintain an interference fit with the ceramic, while the larger inner diameter disc forms a close clearance fit to the same ceramic. In preferred embodiments, 13 of the disc assemblies are pressed onto a first bore tube, and 14 are pressed onto a second one.

FIGS. 2a through 2c show a configuration of the two grid bore assemblies constituted as shown in FIGS. 1a through 1c and assembled within an outer glass envelope tube of the laser. In FIG. 2a, the tubing 203 forms the exterior structure for the laser. The outer tube 203 is of such a diameter that the grid bore assemblies 201 and 202 slide easily therein, but are maintained relatively stationary when inserted. Centrally located within the main tube 203 is a cathode assembly, which is shown in cross-section in FIG. 2c. As may be seen from FIG. 2b, the cathode assembly includes a pair of input terminals 204 and 206, and connected thereto within the outer tube 203 is an electrode assembly 207 preferentially consisting of a barium compound impregnated tungsten matrix cathode. The cathode elements 207 are connected to the cathode terminals 204 and 206 by means of glass tubings which form seals at the glass beads 208 and 209.

When the cathode assembly is attached as shown in FIGS. 2a and 2b, and the grid bore assemblies 201 and 202 are inserted into the outer tube 203 as shown, permanent fixture thereof is called for. It may be noted first, however, that in FIG. 2a the junction between the central bore tubes 201 and 202 is offset slightly from the cathode assembly, which is located approximately at the center of the outer tube 203. While it is not necessary to offset the bore junction from the cathode element as shown, it has been empirically determined that superior laser action occurs if the juncture is offset from the cathode. When assembled, the tubes of grid bore assemblies 201 and 202 actually touch one another.

Next, temporary vacuum seals are made at each end of the tube 203, with grid bore units 201 and 202 enclosed therein. This may be accomplished by means of rubber "O" rings. The full assembly is then mounted on a glass-working lathe, and a mixture of 95% argon and 5% hydrogen is introduced into the tube at approximately a few cubic feet per hour. A vacuum pump is connected to the other end of the full tubing assembly, and is adjusted to maintain a pressure difference across the tube 203 of about 0.2 atmospheres, thereby creating a partial vacuum inside.

The full assembly may be maintained on the glass working lathe by means of a taut wire passing through both ceramic bores. In view of subsequent procedures, it is important that the wire be impervious to the heat levels utilized; a taut tungsten wire fits this specification well. The wire may be maintained in tension by means of weight or spring loading, or the like.

The full glass envelope 203 is heated while on the lathe until the glass moves in to lock each of the 27 double grid assemblies into place. That is, since a partial vacuum is being maintained within the tube 203, heating of the outer surface causes shrinkage about the periphery of the disc grid assemblies. FIG. 2c illustrates in somewhat exaggerated perspective the juncture of two of the discs 211 and 212 with the outer tube 203 after this melting process has been completed. Not only are the discs 211 and 212 connected in a tight joint with the outer tube 203, but both of the grid bore assemblies 201 and 202 are thereby firmly fixed within the outer tube 203. Upon completion of this shrinking operation, the vacuum pump is disconnected while the flow of gas continues through the assembly of FIG. 2a.

Next, starting at the gas inlet end, each of the double grid assemblies is individually reheated. As this sequence proceeds from the gas inlet to the gas exhaust end of the tube, contaminants move toward the outlet end. Assuming in FIG. 2a that the gas inlet is on the left side and the gas exhaust on the right, this heating procedure would involve sequential treatment of the thirteen double grids from left to right, on the left-hand grid bore assembly 202, followed by similar treatment of the fourteen grids on other assembly 201.

As the cathode vicinity of the assembly is reached, the principal function to be performed is the alignment of the two separate grid bore assemblies 201 and 202 such that a single, continuous bore is formed from end to end of the tube 203. This result is insured by means of the taut tungsten wire which runs through the central bore of assemblies 201 and 202. In order to insure that proper alignment occurs the central heated region of the glass envelope may be paddled with a carbon paddle. Perfect alignment is thus assured by moving the tungsten wire somewhat.

Once the central portion of the assembly shown in FIG. 2a is processed, the fourteen double grids of the second grid bore assembly 201 may be processed individually by heating the outer glass tubing 203 in that region successively from left to right. When this procedure has been followed to the right end of the FIG. 2a apparatus, the entire tube has been cleaned of contaminants and the proper alignment of the bore in assemblies 201 and 202 has been insured. When the assembly is fully cooled the hot wire is removed from the assembly, and the excess glass length of the outer tube 203, which includes the visible contaminants driven by the heating process to the gas outlet end, is removed by fire cutting.

In summary, the procedures to this point have involved the construction of two grid bore assemblies 201 and 202 and insertion thereof into an outer glass envelope 203 along with a central cathode assembly. The entire assembly is heated with the interior subjected to partial vacuum such that the outer tube shrinks about the disc assemblies. Next, with a tungsten wire passing through the central bore, the grid units and the central part of the tube are heated sucessively from one end to the other in order to assure a clean tube interior and a precise alignment of the bores.

The next procedures involve assembly of anode apparatus at either end and the attachment thereto and adjustment of mirrors. Illustrative of these procedures are FIGS. 3a through 3d, which show sundry views of the end portions of the laser. It should be pointed out that the laser represented in part in FIG. 3a is symmetric about the cathode element, such that similar apparatus, not shown, is situated on the other end of the laser. In order to facilitate understanding, the anode apparatus of FIG. 3a is also shown cross-sectionally in FIG. 3b.

The next steps, which provide for ring seal assemblies at each end as shown in FIG. 3a, first involve interconnection of a cataphoretic cadmium containment flare 320, and anode getter assembly including elements 321 through 324, and an anode terminal 326. The anode construction shown in FIGS. 3a and 3b is well known in the art, and shall not be described in detail herein. The anode terminal 326 is sealed to the outer tube 203 by means of a glass bead similar to those utilized to attach the cathode element as shown in FIG. 2a. Next, uranium glass transition caps are sealed, made somewhat re-entrant (i.e., shortened in overall length by collapse to half length), and then fire cut to the length shown in FIG. 3a. Also, conventional coated mirrors such as shown in FIGS. 3c and 3d are produced by well known procedures. Then, the grid-cathode-bore assembly complete with the uranium glass transition cap 328 and the anode apparatus is held in a turning fixture which is adjusted so that the ceramic tubing inner diameter is precisely on the axis of the lathe.

The foregoing steps relative to the FIG. 3a apparatus are known in the prior art, as is the apparatus itself.

The next task is to attach and align the mirror assembly 329 along the principal axis of the apparatus of FIG. 3a. In other words, the foregoing procedures have insured that the central bore of assemblies of 201 and 202 is precisely in alignment with the cataphoretic containment flare 320 and with the Uranium Glass Transition cup 328. Since lasing action will be instituted through the central bore between mirrors 329 positioned at the extreme ends of the laser, those mirrors must be aligned such that reflection extends precisely along the axis of the central bore. Hence, if flat mirrors are utilized, their surface must be perpendicular to the central bore. Likewise, if curved mirrors are utilized, their centers of curvature must be adjusted to the main bore axis. This may be accomplished as follows. The mirror assembly 329 is held on a vacuum chuck type adjustable mirror mount, which is situated approximately along the principal axis of the lathe. An ordinary laser, such as a helium-neon laser, is positioned approximately on the lathe axis. Then, by means of the light cast from the helium neon laser onto the mirrors, two mirror adjustments are made to insure that the mirror is aligned precisely onto the lathe axis. That is, flat mirrors would be adjusted to be perpendicular to the lathe axis (and to the laser beam), and the curved mirror is adjusted until its center of curvature is on the lathe axis. When properly adjusted along the lathe axis, the mirror in its vacuum chuck mount may be rotated on the lathe axis without visibly moving the laser beam reflected from its first surface. Having thusly aligned the mirrors with the laser axis, both mirrors are sealed onto the tube at its ends.

After both mirrors are sealed onto the tube in the approximately exact alignment established above, the tube is evacuated and dosed with helium and cadmium utilizing conventional techniques. Thus, the complete fabrication has been achieved, but the laser as assembled ordinarily will be found to lase either weakly or not at all. This failure to perform adequately often is due to a slight imperfection in the alignment procedure, or alternatively to unpredictable thermal bending effects. If imperfect laser operation occurs, the following extra alignment procedure may be performed.

An electrically heated oven with an inner diameter of approximately 17 millimeters and a hot length of approximately 15 millimeters is positioned over the out-of-tune mirror neck in the region of the anode of the laser. When such heat is applied, a very slight transverse turning force may be applied to the mirror while the neck oven is hot. This in turn results in a desired permanent set at the correct mirror tuning. In many cases, this slight transverse tuning procedure only needs to be performed for the mirror at one end of the laser tube.

It is to be understood that select ones of the features outlined herein may be applicable and advantageous to processes for fabricating lasers which are other than cataphoretic in structure. For example, the successive localized heating to drive out contaminants is susceptible to broad general application. Likewise, the final mirror tuning step is amenable to fabrication processes for a large class of lasers other than the cataphoretic laser embodiment dealt with herein.

Furthermore, it is to be understood that the principles of the present invention as collectively disclosed herein are not limited to the particular embodiments described. Rather, numerous alternate embodiments and applications may occur to those skilled in the art without departure from the spirit or scope of the present invention as set forth in the appended claims.

We claim:

1. In a process for fabricating laser apparatus having an outer envelope, the method of securing mirrors in precise adjustment with said laser apparatus comprising the steps of:
   a. mounting said mirrors permanently and rigidly at the ends of said envelope substantially normally to the principal axis of said apparatus;
   b. energizing said laser apparatus;
   c. heating a relatively narrow portion of said envelope in the region of at least one of said mirrors; and
   d. permanently deforming said narrow portion of said housing by applying sufficient transverse force to said one of said mirrors to produce efficient lasing action in said apparatus.

2. A method as described in claim 1 wherein said heating and applying steps are performed substantially simultaneously upon mirrors located at opposite ends of said envelope.

* * * * *